United States Patent Office 2,962,938
Patented Dec. 6, 1960

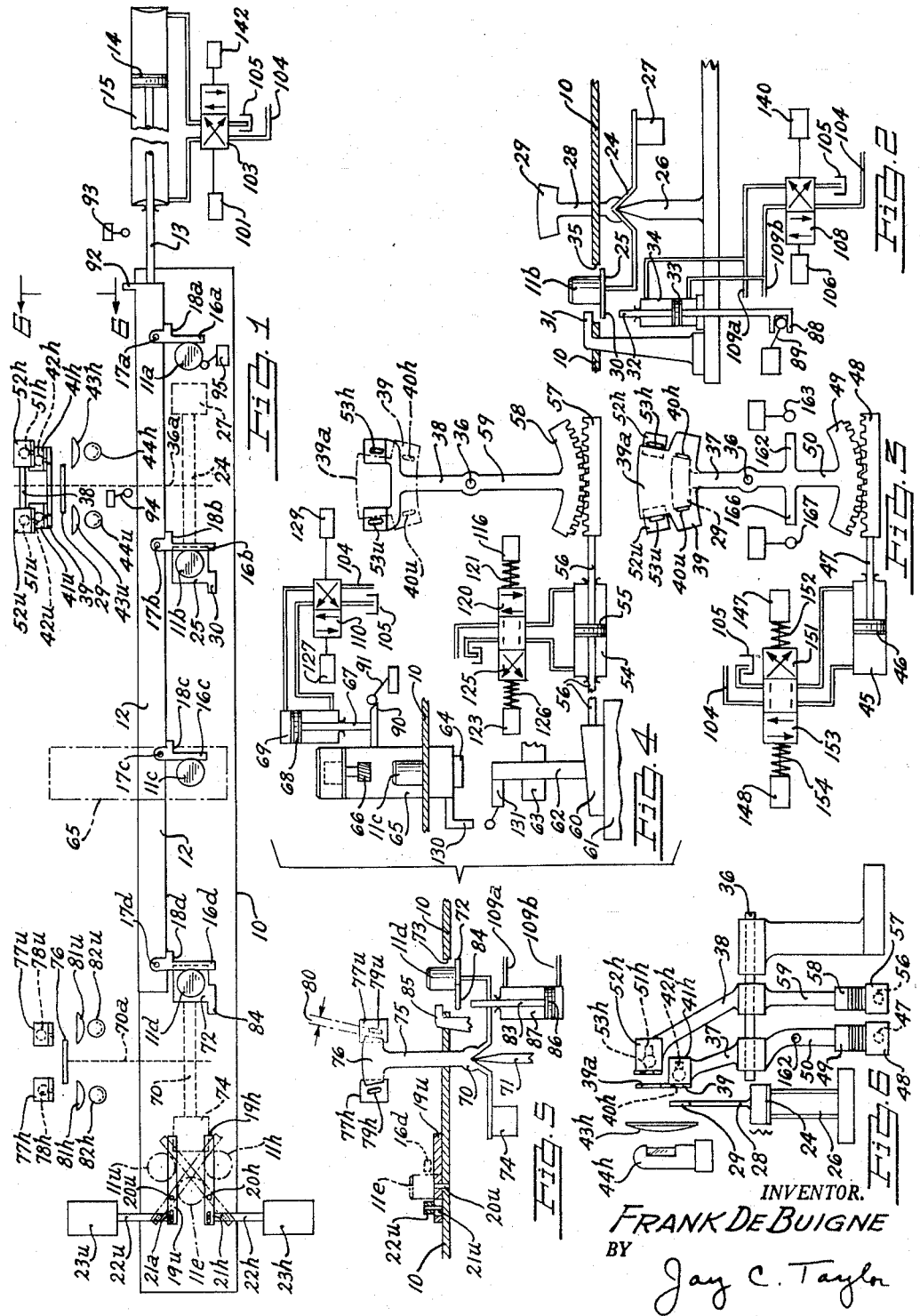

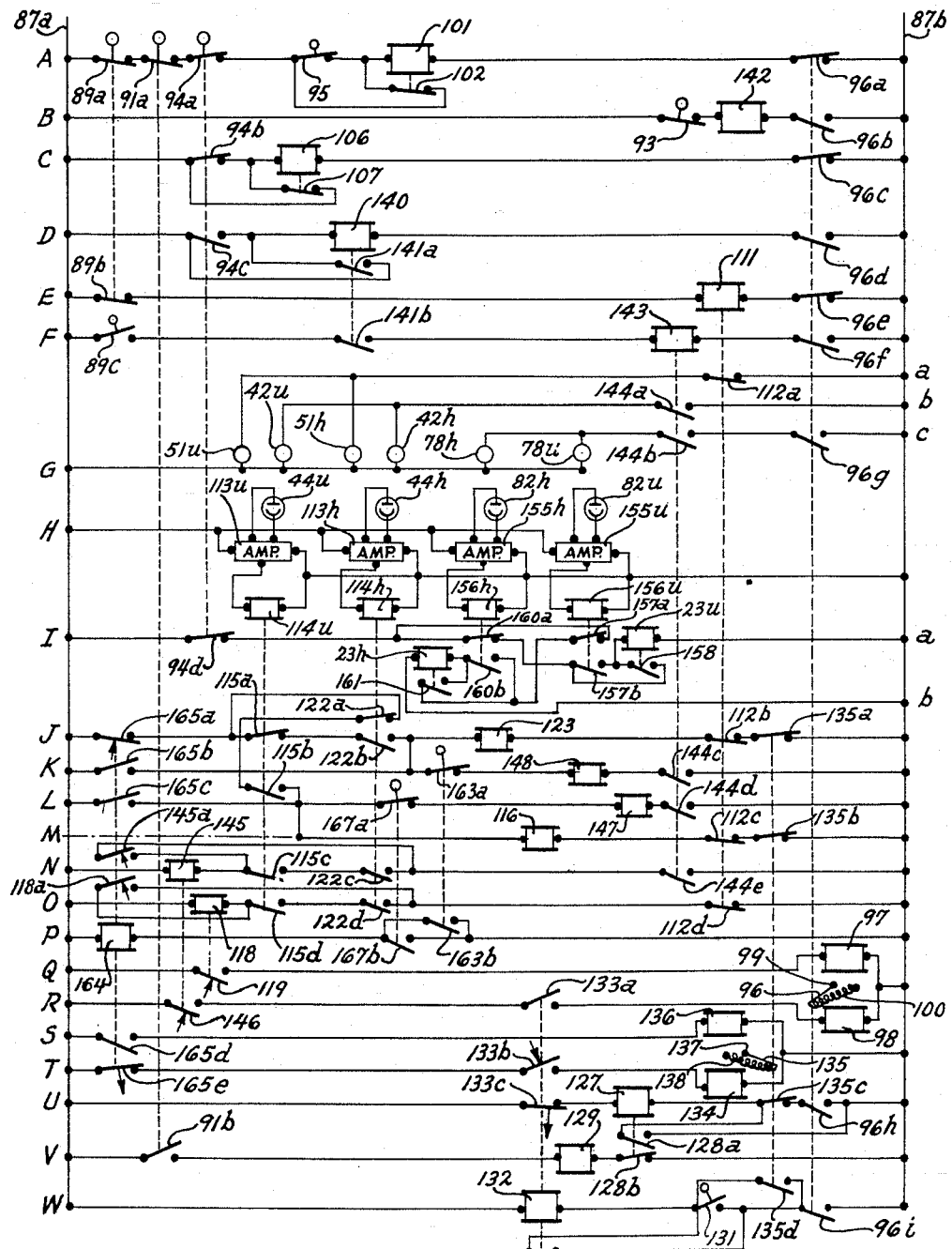

2,962,938

APPARATUS FOR CONTROLLING THE MACHINING OF PARTS TO PREDETERMINED WEIGHTS

Frank De Buigne, Birmingham, Mich., assignor to La Salle Tool, Inc., Detroit, Mich., a corporation of Michigan Filed Jan. 10, 1955, Ser. No. 480,742

3 Claims. (Cl. 90—11)

This invention relates to the fabrication of work pieces to critical weights and has for its primary objects the provision of an apparatus for milling work pieces to predetermined weights.

In the fabrication of various types of parts such as automobile pistons, by way of example, it is important to control the weight of the finished part within narrow limits. It is customary to form such parts slightly overweight, to weigh the formed parts to determine the amount of excess weight, and thereafter to mill off the excess weight.

In accordance with the present invention, each of a succession of such parts is weighed in turn at a weighing station. A shiftable indicator is moved proportionately to the weight of the part to indicate the weight. A shiftable recorder is then moved to a predetermined position of alignment with respect to the indicator to record the weight, whereby the position of the recorder corresponds to said weight and the indicator is subsequently made available to indicate the weight of the next successive part at the weighing station. A shiftable adjustment member is then moved to a predetermined position of alignment with respect to the recorder, whereby the position of the adjustment member corresponds to said weight and the recorder is also subsequently made available to record the weight of said next successive part.

Meanwhile the weighed part is shifted to a milling station spaced from the weighing station and the next successive part is shifted to the weighing station for weighing. The adjustment member is coupled with adjustment means for a milling apparatus at the milling station, whereby as the adjustment member is moved as aforesaid in accordance with the weight of the part now at the milling station, the milling apparatus is also adjusted in accordance with the latter weight to mill the excess material from the latter part.

Another object is to provide improved and highly efficient means for carrying out the foregoing process automatically and to effect the milling operation on each part simultaneously with the weighing of the next successive part.

Another object is to employ the indicator and recorder in a field or beam of energy which is affected when the recorder is not at the aforesaid predetermined position of alignment with respect to the indicator, so that when the indicator is moved during a weighing operation to indicate the weight of a part, the affected field or beam of energy will cause a corresponding movement of the recorder to re-establish the condition of alignment.

The field or beam of energy may comprise light or other electromagnetic phenomena, supersonic sound, or other suitable readily controlled energy, and is maintained when movement of the recorder is required, then dissipated to permit subsequent movement of the indicator as required independently of the recorder.

The recorder and adjustment member are similarly employed in a second field or beam of energy which is maintained when alignment of the adjustment member with the recorder is required, then dissipated to permit subsequent movement of the recorder as required independently of the adjustment member.

Other objects of this invention will appear in the following description and appended claims, reference being had to the accompanying drawings forming a part of this specification wherein like reference characters designate corresponding parts in the several views.

Fig. 1 is a fragmentary schematic plan view illustrating the general relationship of significant parts comprising one embodiment of the present invention, showing the feed, weighing, milling, reweighing, and sorting stations.

Fig. 2 is a fragmentary schematic front elevational view illustrating the general relationship of significant parts of the weighing means at the weighing station, the slideway being shown in vertical section.

Fig. 3 is a fragmentary schematic front elevational view illustrating the general relationship of significant parts at the weighing station.

Fig. 4 is a fragmentary schematic front elevational view illustrating the general relationship of significant parts of the mill adjustment and milling means at the weighing and milling stations.

Fig. 5 is a fragmentary schematic front elevational view illustrating the general relationship of significant parts of the reweighing and sorting means at the reweighing and sorting stations.

Fig. 6 is a fragmentary schematic side elevational view illustrating the general relationship of significant parts at the weighing station as seen from the right in Fig. 1.

Fig. 7 is a schematic diagram of an electromagnetic circuit suitable for use with the apparatus illustrated in Figs. 1 through 6.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, an embodiment of the present invention is illustrated by way of example comprising a horizontal guideway 10 extending along a number of progressive work stations comprising a feed station to which a part 11a is fed, a weighing station at which a part 11b is weighed, a milling station at which a part 11c is milled to a predetermined weight, a reweighing station at which a part 11d is reweighed for a final check, and a sorting or selector station whereat a part 11e within a predetermined weight range is selected for subsequent work operations, or whereat parts 11h and 11u that are either too heavy or underweight art sorted to the left and right respectively of the guideway.

The several work pieces shown in the present instance are pistons for an internal combustion engine and are suitably fed one at a time to the feed station, as indicated by the piston 11a, preferably in synchronism with the mechanism to be described. From the feed station, the piston is progressively shuttled to the weighing, milling, reweighing and sorting stations by operation of a reciprocal shuttle bar 12 secured to the plunger 13 of a hydraulically actuated piston 14 reciprocal within a cylinder 15 in an operative hydraulic circuit as described below. Associated with each of the feed, weighing, milling and reweighing stations is a shuttle arm 16a, 16b, 16c, and 16d respectively pivoted at 17a, 17b, 17c, 17d respectively on the shuttle bar 12 and extending at right angles therefrom so as to engage the pistons 11a through 11d simultaneously upon shifting of the bar 12 from right to left in Fig. 1.

The stroke of the shuttle bar 12 is determined so that upon each leftward shuttle operation, each of the pistons 11a through 11d is moved to the next successive position or work station. During the leftward shuttle movement, counterclockwise swinging of the arms 16a through 16d from their perpendicular position shown in Fig 1 is prevented by the projections 18a, 18b, and 18d thereon respectively which abut the bar 12. Upon the return or rightward shuttle movement, the shuttle arms are free to pivot clockwise so as to pass completely to the right of the pistons newly located at their associated work stations without disturbing the latter pistons. In this regard, suitable means will be employed if desired to prevent contact between the pistons and the shuttle arms during the rightward or return shuttle movement. Intermediate successive leftward shuttle operations, a new piston to be milled to a predetermined weight is suitably fed to the feed station, as at 11a, so that during the normal course of operation, a piston will be located at each work station prior to each shuttle operation.

It is customary in the manufacture of pistons of the above character to cast the same slightly overweight and then to mill the same to the desired correct weight. In accordance with the present invention, each piston is shifted by successive shuttle operations first to a weighing station where the amount of excess material is determined, then to a milling station where the excess metal is removed, then to a reweighing station where the weight is checked. If the final weight is found to be within predetermined limits, the piston is shifted by the next successive shuttle operation to the position indicated at 11e. Otherwise, if the piston at 11d is either underweight or too heavy, it will be guided to the position 11u or 11h by selective operation of a pair of swinging gates 19u or 19h. The latter are pivoted at 20u and 20h respectively on the guide 10 adjacent opposite sides of the piston 11e. In the present instance, the leftward ends of the gates 19u and 19h are pivotally connected at 21u and 21h to horizontally reciprocal plungers 22u and 22h, which are actuated by solenoids 23u and 23h respectively. The latter pivotal connections permit limited lost motion or relative sliding movement between the connected parts, whereby either gate 19u or 19h is swung angularly across the path of shuttle movement of the piston 11d upon retraction of the corresponding plunger 22u or 22h, as described below.

Weighing of a piston 11b at the weighing station is accomplished by a platform balance 24 having a piston receiving pan or platform 25 adapted to receive a piston thereon by operation of the shuttle, Fig. 2. The balance 24 is pivoted on the upper horzontal knife edge of a fixed support 26 and is counterbalanced by a weight 27 on an arm directed oppositely from the arm supporting pan 25. Extending upwardly from the knife edge is a vertically swinging weight indicating arm 28 of the balance 24 which terminates in an opaque cross member or shield 29. The latter will swing to the left or right, Fig. 2, about the axis of the knife edge in accordance with the customary operation of a platform balance, depending upon the weight of the work piece 11b on the pan or platform 25.

During leftward movement of the shuttle bar 12, the upper edge of the platform 25 is normally maintained flush with the upper edge of the guideway 10 by means of a projection 30 of the platform 25 adapted to be pressed firmly upwardly against an overlying fixed stop 31 by means of a vertically reciprocal plunger 32. The latter is secured to a hydraulically actuated piston 33 reciprocal within cylinder 34 in the hydraulic circuit as described below. Upon downward movement of plunger 32, the platform 25 is released to swing downwardly within a mating opening 35 in the guideway 10 until the balance 24 reaches its equilibrium position.

Extending horizontally rearwardly and coaxially with the knife edge of the support 26 is a fixed shaft 36, Fig. 6, having a recording arm 37 and a mill adjustment arm 38 pivotal thereon and extending upwardly therefrom. In order to simplify the drawing, details of the shaft 36 and arms 37 and 38 are not indicated in Fig. 1, although the axis of the shaft 36 is indicated by the dotted line 36a in Fig. 1. The recording arm 37 is located rearwardly of the indicating arm 28 and the mill adjustment arm 38 is located rearwardly of the recording arm 37. Extending upwardly from the arm 37 in an opaque shield 39 arranged to swing directly behind shield 29, the lower portion of shield 39 being provided with a pair of generally radial slits 40u and 40h spaced circumferentially so that a rearward projection of shield 29 or shield 39 will barely fail to cover both slits 40u and 40h simultaneously when arms 28 and 37 are swung into a position of alignment with respect to each other as illustrated in Fig. 3. Upon swinging of the shield 29 in one direction or the other from the position of alignment, one or the other of the slits will be covered.

Secured to shield 39 immediately behind the slits 40u and 40h are housings 41u and 41h containing electric lamps or light bulbs 42u and 42h respectively arranged to shine forwardly through their respective slits in horizontal beams parallel to the axis 36a. When the shields 39 and 29 are in alignment, the light beams from both slits 40u and 40h will shine past the opposite ends of shield 29, through fixed focusing lenses 43u and 43h respectively and onto the photosensitive elements of fixed photoelectric tubes or cells 44u and 44h respectively. If the shield 29 moves to the left or right of its position of alignment with shield 39, as for example in a weighing operation, light from slit 40u or 40h, as the case might be, will be blocked from the corresponding photocell 44u or 44h by shield 29.

The photocells 44u and 44h are in a suitably adjustable electromagnetic control circuit for the aforesaid hydraulic circuit, which includes a cylinder 45 having a hydraulically actuated piston 46 reciprocal therein, Fig. 3. A plunger 47 reciprocal with piston 46 extends outwardly from cylinder 45 and is secured to the left end of a gear rack 48. Meshed with rack 48 is a sector gear 49 concentric with the axis 36a and secured to a lower projection 50 of the arm 37 to swing the same. When the electromagnetic control circuit is adjusted to a weight recording condition, as described below, and both photocells 44u and 44h are energized simultaneously, no actuation of the hydraulic circuit is effected. If on the other hand shield 29 is shifted either to the left or to the right of its position of alignment with shield 39 to block light from slits 40u or 40h, as the case might be, the corresponding phototube 44u or 44h will be de-energized, thereby to cause electromagnetic control circuit to actuate the hydraulic circuit and shift piston 46 to the right (in the event that tube 44u is de-energized) or to the left (in the event that tube 44h is de-energized). In consequence of the leftward or rightward shifting of piston 46, shield 39 is swung correspondingly to the right or left in Fig. 3 until light from both slits 40u and 40h again shines past shield 29 and energizes both tubes 44u and 44h concurrently.

Accordingly, while the electromagnetic control circuit is properly adjusted for a weight recording operation and lamps 42u and 42h are energized or illuminated, a shift of shield 29 in one direction or the other will result in a corresponding shift of shield 39 to record the weight indicated by the position of shield 29. Thereafter, the electromagnetic control circuit is set or adjusted for a mill adjustment operation and both lights 42u and 42h are extinguished to permit swinging of shield 29 independently of shield 39. In this latter situation shield 39 and the recording arm 37 are hydraulically locked in position to record or "remember" the weight formerly indicated by the position of shield 29, the latter being now free to indicate the weight of the next successive piston placed on the platform 25, as for example by operation of the shuttle bar 12.

After the weight of a piston at the weighing station is weighed and recorded, plunger 32 is moved upwardly to clamp platform 25 flush with guideway 10. Thereafter shuttle bar 12 is operated to shift piston 11a to the weighing station and to shift piston 11b to the milling station. Plunger 32 is then lowered to release platform 25 for the next successive weighing operation, permitting the weight of the new piston at the weighing station to be indicated by the equilibrium position assumed by arm 28 and shield 29. During the course of operation of the shuttle, a second pair of electric lamps 51u and 51h arranged within housings 52u and 52h to shine forwardly through generally radial slits 53u and 53h respectively in the latter housings are turned on or energized. The latter housings are mounted on the upper end of the mill adjustment arm 38 with the slits 53u and 53h spaced circumferentially and located above an upper opaque shield portion 39a of the shield 39, so that when the arms 37 and 38 are swung to a position of alignment with respect to each other, the shield portion 39a will barely fail to block light from both slits 53u and 53h simultaneously. Thus light from slits 53u and 53h will shine through the focusing lenses 43u and 43h respectively and onto phototubes 44u and 44h respectively. Upon shifting of arm 37 either to the left or to the right of the position of alignment with arm 38, as for example during a weight recording operation, light from slit 53u or 53h, as the case might be, will be blocked by shield 39a and the corresponding phototube 44u or 44h will be de-energized.

During the time that lamps 51u and 51h are energized or on and the electromagnetic circuit containing phototubes 44u and 44h is at the mill adjustment condition, the de-energizing of tube 44u or 44h causes the electromagnetic control circuit to actuate the hydraulic circuit to shift piston 55 to the right (in the event that tube 44u is de-energized) or to the left (in the event that tube 44h is de-energized). A plunger 56 connected with piston 55 and having a portion extending to the right from cylinder 54 is connected with a rack 57 in mesh with a sector gear 58 secured coaxially with axis 36a on a lower extension 59 of the mill adjustment arm 38. Accordingly upon leftward or rightward shifting of piston 55, the mill adjustment arm is swung correspondingly to the right or left in Fig. 4 about the axis 36a to the position of alignment with arm 37 where the light shining from slits 53u and 53h again shines past the upper shield portion 39a to energize both tubes 44u and 44h concurrently. Thereafter piston 55 will be hydraulically locked in its adjusted position and lights 51u and 51h will be de-energized until the next successive mill adjustment operation.

As illustrated in Fig. 4, the plunger 56 also extends to the left from cylinder 54 and is secured to the large end of a wedge 60. The latter has a flat base which slides on the upper horizontal surface of a fixed guide or support 61. The upper surface of wedge 60 declines to the left and supports a vertically shiftable plunger or stop 62 slidable through the bore of a fixed guide 63. The upper edge of plunger 62 underlies a boss 64 of the vertically slidable carriage 65 of a milling machine. The latter carries a milling or cutting tool 66 arranged directly over the piston 11c at the milling station. The carriage 65 is connected to the lower end of a vertically reciprocal plunger 67 attached to a hydraulically actuated piston 68 within a cylinder 69 contained in the aforesaid hydraulic circuit.

As carriage 65 is shifted downwardly, the tool 66 will move into contact with the piston 11c to mill material therefrom, the quantity of material removed being determined by the position of wedge 60 which adjusts the vertical position of stop 62. The latter limits the downward movement of carriage 65 by abutting boss 64. It is to be noted that the heavier the piston 11b at the weighing station, the further will indicating shield 29 be shifted to the left or counterclockwise in Figs. 2 and 3. Since as described above the recording arm 37 will likewise shift counterclockwise into alignment with shield 29, and since the mill adjustment arm 38 will also shift counterclockwise into alignment with shield 39, the heavier the piston 11b at the weighing station, the greater will be the counterclockwise adjustment movement of the arm 38 in Fig. 4. Correspondingly the greater will be the rightward movement of plunger 56 and wedge 60, the greater will be the downward movement permitted to carriage 65 during a milling operation as described below, and the larger will be the quantity of material removed by cutter 66. If the weight indicating shield 29 should shift to the right during a weighing operation, the arms 37 and 38 will also shift to the right during the course of the operations as described above and wedge 60 will shift to the left, raising plunger 62 and reducing the extent of downward movement and the quantity of material that will be removed from the piston at the milling station. Since the density of the material of the piston 11b is known, the taper of the wedge 60 is determined as a function of the excess weight of the piston to be removed in the milling operation.

By virtue of operating the adjustment arm 38 simultaneously with the leftward shuttle movement, approximately by the time the piston 11b that was weighed at the weighing station is shifted to the milling station so as to replace the piston 11c, the mill adjustment mechanism including the wedge 60 will be adjusted in accordance with the weight of the piston 11b.

Upon completion of the mill adjustment and leftward shuttle operations, the electromagnetic control circuit extinguishes lamps 51u and 51h and actuates the hydraulic circuit containing cylinder 69, Fig. 4, to cause downward shifting of carriage 65 to effect the milling operation. The cutting tool 66 is powered by any suitable means and the actual milling operation, limited by abutment between the boss 64 and plunger 62, is carried out in accordance with conventional practice. Also, substantially concurrently with the milling operation, the electromagnetic control circuit is actuated to initiate downward movement of plunger 32 to permit the next successive weighing operation on the piston 11a which has now been shifted by the shuttle movement to replace piston 11b at the weighing station. Approximately by the time that balance 24 comes to equilibrium during said next successive weighing operation, lamps 42u and 42h are again energized to permit a repetition of the recording operation as described above.

Since each piston 11c after being milled is shifted leftward to replace the piston 11d at the reweighing station simultaneously with the shifting of the piston 11a to the weighing station, each piston after being milled is reweighed at the reweighing station simultaneously with the weighing of the piston at the weighing station. The reweighing mechanism comprises a platform scale 70 similar to the scale 24 and pivotal vertically about the horizontal knife edge of a fixed support 71, the pivot axis being indicated at 70a in Fig. 1. A platform 72 adapted to receive the piston 11d to be reweighed is arranged to swing within a mating opening 73 in the guideway 10 and is counterbalanced by a weight 74 on a balance arm extending from the pivot axis 70a oppositely from the balance arm supporting piston 11d.

Extending upwardly from the axis 70a is a weight indicating arm 75 of the balance 70 which terminates in an opaque shield 76 comparable to the shield 29. Behind the shield 76 are a pair of fixed housing 77h and 77u containing electric lamps 78h and 78u arranged to shine forwardly through generally radial slits 79h and 79u respectively in the latter housings. The slits 79h and 79u are spaced circumferentially so that when the balance 70 is at the equilibrium position shown in Fig. 5, each of the latter slits will be spaced circumferentially outwardly by an arcuate distance 80 from the adjacent edge of the shield 76. Also when the balance 70 is at the equilibrium position, that fact will indicate that the piston 11d on platform 72 has been milled exactly to the desired weight.

The distance 80 from each slit 79h and 79u to the adjacent edge of the shield 76 is the same in Fig. 5, so that if the weight of piston 11d does not differ from the desired exact weight sufficiently to cause shifting of scale 76 in one direction or the other from the position shown in Fig. 5 by more than the arc 80, light shining forwardly from the slits 79h and 79u will shine through the fixed focusing lenses 81h and 81u respectively to energize the fixed photoelectric cells or tubes 82h and 82u respectively. The latter are arranged in the aforesaid electromagnetic control circuit so that when both photocells 82h and 82u are energized simultaneously, i.e., when the weight of piston 11d is within a predetermined range or tolerance, solenoids 23u and 23h will not be energized and gates 19u and 19h will remain in their positions shown by solid lines in Fig. 1. Thus upon the next successive leftward movement of shuttle bar 12, the piston 11d will be shifted without deflection to the position 11e.

On the other hand, if the piston 11d is either too heavy or underweight beyond the allowable tolerance, shield 76 will shift from the position of Fig. 5 by more than the arc 80, blocking light from slit 79h or 79u as the case might be to de-energize the corresponding phototube 82h or 82u. In consequence the electromagnetic control circuit is actuated to energize solenoid 23h and cause gate 19h to swing to the dotted position shown (in the event that piston 11d is too heavy and phototube 82h remains energized) or to energize solenoid 23u and cause gate 19u to swing to the dotted position (in the event that piston 11d is underweight and phototube 82u remains energized). Thereafter during the next leftward shuttle movement, piston 11d will be moved into sliding engagement with gate 19h or 19u and deflected to the overweight or underweight position 11h or 11u as the case might be.

Similar to plunger 32, a vertically reciprocable plunger 83 is shiftable upwardly to maintain the upper surface of platform 72 flush with the upper surface of guideway 10 during the shuttle operation by clamping a projection 84 of the platform 72 firmly against an overlying fixed stop 85. The plunger 83 is connected with a hydraulically actuated piston 86 reciprocable within cylinder 87 in the hydraulic circuit containing cylinder 34, so that both plungers 32 and 83 operate in unison.

Details of the electromagnetic control circuit controlling the sequence of operation of the above described structure are illustrated in Fig. 7 wherein a number of parallel circuits A through W are shown connected with power leads 87a and 87b. Circuit G branches into three subcircuits Ga, Gb, and Gc connected with power lead 87b. Circuit I branches into two subcircuits Ia and Ib connected with power lead 87b.

*Leftward or forward shuttle operation*

Fig. 7 illustrates the condition of the control circuit corresponding to Fig. 1 during the early stage of the leftward or forward shuttle movement at the time of initial contact between the several shuttle arms 16a through 16d and the corresponding pistons 11a through 11d. At this stage of the operation, the balance platforms 25 and 72 are flush with the guideway 10 and plungers 32 and 83 are at their uppermost positions. The lower end of plunger 32 is provided with a yoke 88 engaged with a limit switch actuator 89, so that when plunger 32 is at its uppermost position, limit switches 89a, 89b, and 89c in circuits A, E and F are at their uppermost positions. Switches 89a and 89b are shiftable in unison and are closed. Switch 89c is open.

Also, at the condition of Figs. 1 and 7, the carriage 65 is at its uppermost position and projection 90 on the lower end of plunger 67 holds limit switch actuator 91 at its uppermost position, so that limit switches 91a and 91b in circuits A and V are closed and open respectively at their uppermost positions.

In Fig. 1, shuttle bar 12 has already shifted leftward from its extreme rightward limit of movement, so that projection 92 thereof has moved leftward from limit switch 93, permitting the same to move to its normal closed position in circuit B. Projection 92 has not yet engaged the limit switch actuator 94, so that limit switches 94a, 94b, 94c, and 94d in circuits A, C, D and I respectively are at their normal downward positions, switches 94a, 94b and 94d being closed and switch 94c being open. Also as illustrated in Figs. 1 and 7, limit switch 95 in circuit A is engaged and held closed by the piston 11a at the feed station.

Inasmuch as the apparatus shown in Fig. 1 is in the process of a shuttle movement, it is assumed that piston 11b has been weighed at the weighing station and the weight recorded by arm 37 during a preceding operation, so that the piston 11b is now about to be shifted to the milling station to replace piston 11c. As described below, completion of the weight recording operation is indicated by downward swinging of relay switch actuator 96, which is under the electromagnetic control of solenoids 97 and 98. Actuator 96 is schematically indicated in Fig. 7 as a swinging arm having a fixed pivot 99 and a swinging end secured to one end of an overcenter spring 100, the other end of spring 100 being fixed under tension to hold the arm 96 either in the downward position shown or in an upward position above the horizontal. When relay 97 is de-energized and relay 96 is energized, arm 96 will be held at the downward position shown by the overcenter spring 100, regardless whether or not solenoid 98 is subsequently de-energized, and the ganged switches 96a through 96i are simultaneously held at their downward positions shown, switches 96a, 96c, and 96e being closed and switches 96b, 96d, 96f, 96g, 96h, and 96i being open.

It is apparent that when the apparatus is in the condition illustrated in Figs. 1 and 7, solenoid 101 in circuit A is energized to close normally open holding a relay switch 102, whereby solenoid 101 remains energized after piston 11a is moved leftward from limit switch 95 to open the latter during the shuttle operation. The energizing of solenoid 101 also causes rightward shifting of hydraulic slide valve 103 to the position shown in Fig. 1, whereby the right and left ends of cylinder 15 are connected respectively to a source of hydraulic pressure 104 and to a tank or drain 105, causing the leftward shuttle movement of piston 14 and bar 12.

Also when the apparatus is in the condition shown in Figs. 1 and 7, solenoid 106 in circuit C is energized to close normally open relay holding switch 107 and to effect rightward shifting of hydraulic slide valve 108 in Fig. 2, so as to connect the lower and upper ends of cylinders 34 and 87 with the source of hydraulic pressure 104 and tank 105 respectively. Accordingly, plungers 32 and 83 during the leftward shuttle movement will be maintained at their upper limits as aforesaid to hold the platforms 25 and 72 flush with the guideway 10. It is to be noted in the above regard that the upper and lower ends of cylinder 87 are connected via hydraulic conduits 109a and 109b with the hydraulic conduits leading to the upper and lower ends respectively of cylinder 34, Figs. 2 and 5. It is also to be noted that the balances 24 and 70 are illustrated during the weighing and reweighing operations, rather than during the leftward shuttle movement as in Figs. 1 and 7, so that solenoid 106 is not energized in Figs. 2 and 5 and slide valve 108 is at its leftward position to cause downward shifting of plungers 32 and 83.

In Fig. 4, hydraulic slide valve 110 is shown at the leftward position which it will assume during the leftward shuttle operation, as described below, so that the lower and upper ends of cylinder 69 are connected respectively to the source of hydraulic pressure 104 and tank 105 to maintain the milling carriage 65 at its upper position whereat the cutting tool 66 is out of engagement with piston 116.

It is also apparent that when the apparatus is in the condition illustrated in Figs. 1 and 7, solenoid 111 in circuit E is energized to close normally open ganged relay switches 112a through 112d. The closure of switch 112a in circuit Ga causes illumination of the mill adjustment lamps 51u and 51h on the mill adjustment arm 38. The closure of switches 112b, 112c, and 112d enables activation of circuits J, M, and O for the mill adjustment operation which takes place simultaneously with the leftward shuttle movement as described below.

*Mill adjustment operation*

It is assumed as aforesaid that the weight of piston 11b at the weighing station has been indicated by the swinging of arm 28 to its appropriate equilibrium position, depending on the weight of that piston, and that recording arm 37 has swung into alignment with arm 28 as described in detail below, thereby to record or "remember" the weight of piston 11b regardless that the indicating arm 28 is now maintained in an inoperative position by plunger 32, the latter being at its uppermost position as required during the leftward shuttle movement to maintain platform 25 flush with guideway 10.

As indicated in circuit H, the photocells 44u and 44h are coupled by amplification circuits 113u and 113h with solenoids 114u and 114h respectively to energize the latter when the corresponding photocell is energized by light shining thereon from the appropriate slit 40u, 40h, 53u or 53h. The amplification circuits 113u and 113h may be conventional if desired and are accordingly not described in detail. If for example the recording arm 37 is located at a weight recording position to the right in Figs. 3 and 4 of the mill adjustment arm 38, thereby to record that the weight of piston 11b is somewhat lighter than the weight corresponding to the current position of mill adjustment arm 38, light from lamp 51u shining through slit 53u will pass to the left of the upper shield portion 39a and energize photocell 44u. Solenoid 114u is thus energized to open normally closed relay switch 115a and close normally open relay switches 115b, 115c, and 115d, thereby to energize solenoid 116 in circuit M via circuit J. Light from slit 53h is blocked by shield 39a, so that phototube 44h is not energized.

Energizing solenoid 116 causes leftward shifting of hydraulic slide valve 120 in the hydraulic circuit containing cylinder 54, Fig. 4, whereby the right and left ends of the latter cylinder are connected respectively to the source of hydraulic pressure 104 and tank 105. In consequence piston 55 and wedge 60 are shifted leftward and the adjustable stop 62 is moved upwardly to reduce the downward movement permitted to carriage 65 during the subsequent milling operation.

Simultaneously with the leftward shifting of wedge 60, rack 57 is also moved leftward to cause clockwise or rightward swinging of the adjustment arm 38 until the latter is aligned with arm 37 and light from both slits 53u and 53h passes the upper shield portion 39a to energize both solenoids 114u and 114h simultaneously, causing normally closed relay switch 122a to open and normally open relay switches 122b, 122c and 122d to close. The opening of switch 122a de-energizes solenoid 116, while open switch 115a prevents the energizing of solenoid 123 in circuit J. Upon the de-energizing of solenoid 116, slide valve 120 is returned to its rightward or closed position by spring 121, Fig. 4, whereby the passage of hydraulic fluid to or from cylinder 54 is blocked and piston 55 is locked in a fixed position with arms 37 and 38 in alignment. Since the position of shield 39 is now determined by the weight of the piston 11b previously weighed at the weighing station, the limit of downward milling movement and accordingly the quantity of material that is to be removed by tool 66 will be proportional to the weight of piston 11b.

Upon the simultaneous closure of both switches 115d and 122d, solenoid 118 in circuit O is energized to initiate the closing of normally open time delay relay switch 119 in circuit Q. The latter is slow to close as indicated by the associated arrow pointing in the direction of closing movement, but opens with normal rapidity. The arrows associated with the several time delay switches illustrated and described below are provided to indicate that the delay of the switch is in the direction of the arrow, the switch being adapted to move with customary rapidity oppositely to the direction of the arrow.

In the event that the rightward movement of mill adjustment arm 38 overshoots the position of alignment with respect to arm 37 and shield 38a so that light shining from slit 53u is blocked from photocell 44u by shield 39a, solenoid 114u will be de-energized to close switch 115a and open switches 115b, 115c and 115d. Phototube 44h remains energized by light from slit 53h, so that solenoid 114h also remains energized. Closure of switch 115a (while switch 122b is closed) energizes solenoid 123 in circuit J. The opening of switch 115d de-energizes solenoid 118 to reset the normally open time delay switch 119 before the latter has time to close in consequence of the prior simultaneous closing of switches 115d and 122d. The energizing of solenoid 123 also causes rightward shifting of hydraulic slide valve 125 to connect the left and right ends respectively of piston 54 to the source of pressure 104 and tank 105. Piston 55 together with wedge 60 and rack 57 are shifted to the right, causing leftward swinging of arm 38 until the passage of light from both slits 53h and 53u to phototubes 44h and 44u respectively is reestablished.

In consequence, both solenoids 114h and 114u are energized, both switches 115a and 122a are opened, both solenoids 123 and 116 are de-energized, both switches 115d and 122d are closed, and solenoid 118 in circuit O is again energized. Upon the de-energizing of solenoid 123, hydraulic valve 125 is returned to its leftward position by spring 126 whereby the passage of hydraulic fluid to and from cylinder 54 is blocked and piston 55 is hydraulically locked against movement. Mill adjustment arm 38 is now aligned with recording arm 37 and stop 62 is adjusted in accordance with the weight of the piston 11b. At this time the mill adjustment operation is complete. After the predetermined time interval required for the closure of switch 119 after the energizing of solenoid 118, switch 119 closes to energize solenoid 97 in circuit Q, thereby to cause upward shifting of switch operator 96 to register the end of the mill adjustment operation. In regard to the operation of time delay switch 119, it is apparent that solenoid 118 might be temporarily energized one or more times before arm 38 comes to rest in alignment with arm 37. The time delay required for closing switch 119 is determined to allow for correction of possible overshooting of the mill adjustment movement of arm 38 and also to assure completion of the leftward shuttle movement.

In the event that the position of the recording arm 37 is initially leftward of arm 38 at the beginning of the mill adjustment operation, indicating that the weight of the piston 11b is heavier than indicated by the current position of arm 38, the latter arm will be shifted leftward or counterclockwise, as described above in regard to the rightward overshooting, until the arms 37 and 38 are in alignment. The mill adjustment operation will be thus completed as stated above and actuator 96 will be shifted upwardly upon the closing of time delay switch 119 to energize solenoid 97.

During the mill adjustment operation as above described and prior to closing of time delay switch 119, the shuttle operation continues toward the end of the leftward movement. During this time, relay switches 96a through 96i remain as shown in Fig. 7. At the end of the leftward shuttle movement, projection 92 trips actuator 94 to open switches 94a, 94b, and 94d, and to close switch 94c. The opening of switch 94a de-energizes solenoid 101 to permit opening of switch 102.

The de-energizing of solenoids 101 and 106 does not in the present instance affect the conditions of slide valves 103 and 108. Valve 103 remains at its rightward position shown in Fig. 1 and valve 108 remains at its rightward position, rather than at the position shown in Fig. 2. Piston 14 at this time is at its limit of leftward movement in cylinder 15, so that no further leftward shuttle movement can take place. Similarly, plungers 32 and 83 are at their limits of upward movement against the bottoms of the projections 30 and 84 respectively, so that no further upward movement of these plungers can take place. The opening of switch 94b and the closing of switch 94c enable the subsequent de-energizing of solenoid 106 and the energizing of solenoid 140 when switch 96c opens and switch 96d closes after the closing of switch 119. The effect of opening switch 94d at the limit of leftward shuttle movement will be explained below.

After allowing time for completion of the leftward shuttle movement, time delay switch 119 will close as aforesaid, energizing solenoid 97 and causing upward shifting of actuator 96 to reverse the positions of switches 96a through 96i from their positions shown in Fig. 7 and thereby simultaneously to de-activate the mill adjustment operation and to initiate the downward milling operation, the downward movement of plungers 32 and 83 to release balances 24 and 70 for their respective subsequent weighing and re-weighing operations, and the return or rightward movement of shuttle bar 12.

The latter movement is initiated by the energizing of solenoid 142 through closed switch 96b while solenoid 101 is de-energized, whereby slidevalve 103 is shifted to the left in Fig. 1 to connect the left and right ends respectively of cylinder 15 to the source of pressure 104 and tank 105, thereby to drive piston 14 and bar 12 to the right. Downward movement of plungers 32 and 83 is initiated by the energizing of solenoid 140 through closed switch 96d while solenoid 106 is de-energized, whereby slidevalve 108 is shifted to the left, as in Fig. 2, to connect the upper and lower ends respectively of the cylinders 34 and 87 to pressure 104 and tank 105, thereby to drive pistons 33 and 86 downward. The hydraulic circuits containing cylinders 34 and 87 are preferably restricted to achieve a retarded rate of downward movement, whereby balances 24 and 70 are released slowly to their equilibrium positions with a minimum of swinging or over-shooting. The de-activation of the mill adjustment operation is effected by the opening of switch 96e which de-energizes the mill adjustment lights 53u and 53h by de-energizing solenoid 111, whereby switches 112a through 112d reopen. Opening of switches 112b and 112c prevents operation of the mill adjustment mechanism upon the subsequent energizing of photocells 44u and 44h as described below during the weight recording operation. Opening of switch 112d de-energizes solenoid 118 to reset or re-open normally open switch 119 and thereby to de-energize solenoid 97. Actuator 96 will remain in the upward position by operation of the over-center spring 100.

Milling operation

The closing of switch 96h energizes solenoid 127 in circuit U to cause rightward-shifting of slide valve 110, Fig. 4, the closing of normally open relay switch 128a, and the opening of normally closed relay switch 128b. Switch 128a closes a holding circuit for solenoid 127, whereas opening switch 128b prevents the energizing of solenoid 129 during the downward milling movement.

The rightward shifting of slide valve 110 connects the upper and lower ends of cylinder 69 to the hydraulic pressure 104 and tank 105 respectively to cause downward movement of piston 68 and carriage 65. Accordingly the milling cutter 66 is moved against the underlying piston that has just been shifted to the milling station by the immediately preceding leftward shuttle movement. Since wedge 60 and stop 62 are adjusted in accordance with the weight of the latter piston, the downward movement of carriage 65 is stopped by abutment between boss 64 and stop or plunger 62 when the quantity of material is removed from the latter piston necessary to reduce the same to the desired weight. As carriage 65 moves downward from its uppermost position of Fig. 4, projection 90 rides off actuator 91 to open limit switch 91a and close limit switch 91b.

Adjacent the limit of downward milling movement as determined by the adjustment of stop 62, projection 130 of carriage 65 engages limit switch 131 on stop 62 to close the latter switch in circuit W, thereby to energize solenoid 132 through closed switch 96i. The energizing and 133d and opens normally closed switch 133c. As and 133d and opens normally closed switch 13c. As indicated by the arrow the latter switch is slow to open and affords a predetermined time delay after the closure of limit switch 131 before de-energizing solenoid 127, thereby to assure that boss 64 will be seated firmly against stop 62 at the end of the downward milling movement. The de-energizing of solenoid 127 now permits switch 128a to open and switch 128b to close, whereby solenoid 129 is energized through closed limit switch 91b. The energizing of solenoid 129 while solenoid 127 is de-energized causes leftward shifting of slide valve 110 to the position shown in Fig. 4, thereby to reverse the movement of piston 68 and return carriage 65 to its upper position. By virtue of holding switch 133d, solenoid 132 remains energized after projection 130 moves upward from limit switch 131 and permits the latter to open.

Meanwhile, at a predetermined time interval after the energizing of solenoid 132, time delay switch 133b closes to energize solenoid 134 in circuit T. The latter causes a resetting or downward swinging of actuator 135 in the event that the latter had previously been moved upward by operation as explained below. Actuator 135 is under the control of solenoids 134 and 136 similarly to the manner that actuator 96 is under the control of solenoids 98 and 97 and as indicated schematically has a fixed pivot 137. An overcenter spring 138 is connected under tension between the swinging end of actuator 135 and a fixed point as shown in order to hold the actuator 135 in either its upper or lower position unless shifted by the appropriate solenoid 134 or 136.

Weighing and reweighing

Concurrently with the milling operation initiated by the upward shifting of actuator 96, the downward movement of plungers 32 and 83 is initiated by closing of switch 96d, whereby solenoid 140 in circuit D is energized by reason of the now closed limit switch 94c, it being recalled that the upward movement of actuator 96 was delayed by time delay limit switch 119 until completion of the leftward shuttle movement of projection 92. The energizing of solenoid 140 closes normally open relay switches 141a and 141b, the former closing a holding circuit for energizing solenoid 140 after the subsequent opening of limit switch 94c. The closing of switch 141b enables the energizing of lamps 42u and 42h, 78u and 78h upon completion of the downward movement of plungers 32 and 83 as described below.

As plunger 32 moves downwardly from its upward position, actuator 89 engaged by yoke 88 is shifted to open switches 89a and 89b. Opening of switch 89a prevents any subsequent leftward shuttle movement while the pans 25 and 72 are not firmly clamped at their uppermost positions. The opening of switch 89b assures that solenoid 111 and the mill adjustment lights 51u and 51h cannot be energized during the weighing and reweighing operations. By the time the retarded downward movement of plungers 32 and 83 is complete, balances 24 and 70 will have come to their equilibrium conditions to indicate the true weights of the pistons thereon. At the limit of downward movement of yoke 88, actuator 89 is shifted to close limit switch 89c in circuit F to initiate the next successive weight recording or memory operation and sorting operation as described below.

*Return shuttle movement*

Meanwhile, concurrently with the downward movement of plungers 32 and 83 and of milling carriage 65, switch 96b in circuit B closes to energize solenoid 142 which, while solenoid 101 is de-energized by virtue of open switches 94a and 96a, causes the rightward or return shuttle movement of arm 12. As projection 92 rides to the right from actuator 94, limit switches 94a through 94d are returned to their positions shown in Fig. 7. The closing of switches 94a and 94b has no effect at this time because switches 96a and 96c are open The opening of switch 94c does not de-energize solenoid 140 because of holding switch 141a which is now closed. Upon completion of the return shuttle movement, projection 92 engages limit switch 93 to open the latter as at the beginning of the shuttle movement, thereby to de-energize solenoid 142. Inasmuch as both solenoids 101 and 142 are now de-energized, slide valve 103 remains at its leftward position, but no further rightward movement of piston 14 occurs because the latter is at its limit of rightward movement.

Approximately at the time of completion of the rightward shuttle movement, plungers 32 and 83 reach their limits of downward movement whereat yoke 88 engaged with actuator 89 closes limit switch 89c, thereby energizing solenoid 143 in circuit F through switches 141b and 96f which are now closed. The weight recording and sorting operations are thus initiated simultaneously as described below.

*Weight recording or memory operation*

The energizing of solenoid 143 initiates the recording and sorting operations by closing normally open switches 144a through 144e. Switches 144a and 144b are in circuits Gb and Gc for lamps 42u, 42h and for lamps 78u, 78h respectively, so that these lamps are now illuminated to energize their respective photocells when not shielded therefrom. The closing of switches 144c and 144d in circuits K and L respectively enable the closing of one or the other of these circuits upon the closing of switch 122b or 115b. The closing of switch 144e enables the energizing of solenoid 145 when both switches 115c and 122c are closed, thereby to initiate the closing movement of normally open time delay relay switch 146. The latter switch is slow to close as indicated by the associated arrow.

If the shield 29, after having reached its equilibrium position corresponding to the weight of the piston on the platform 25, is at one side or the other of the position of alignment with recording arm 37, then one or the other of slits 40u and 40h will be exposed to emit light to one or the other of phototubes 44u and 44h to energize the same. In consequence one or the other of solenoids 114u and 114h will be energized to close switch 115b or 122b, thereby to energize the corresponding solenoid 147 or 148 in circuits L or K. It is to be noted that the mill adjustment circuits J, M and O are open and inactive because of open switches 112b, 112c, and 112d.

The energizing of solenoid 147 while solenoid 148 is de-energized causes hydraulic slide valve 151 to shift to the left in Fig. 3 against the tension of spring 152, thereby to connect the right and left ends of cylinder 45 to the hydraulic pressure 104 and tank 105 respectively and cause leftward shifting of piston 46. Similarly the energizing of solenoid 148 while solenoid 147 is de-energized shifts slide valve 153 to the right against the tension of spring 154, thereby to reverse the hydraulic pressure in cylinder 45 to shift piston 46 to the right. Springs 152 and 154 return the corresponding slide valves 151 and 153 to the positions shown in Fig. 3 when their solenoids 147 and 148 are not energized.

If for example the equilibrium position of shield 29 after the weighing operation is at the right of its position of alignment with arm 37, indicating that the piston on pan 25 is lighter or underweight with respect to the weight of the piston recorded in the previous recording operation by arm 37, light from slit 40u will shine on phototube 44u to energize the latter and relay 114u, thereby to open switch 115a and close switches 115b, 115c and 115d. Solenoid 147 will then be energized to cause rightward or clockwise swinging of arm 37 into alignment with arm 28, whereupon both slits 40u and 40h will be exposed to emit light to both phototubes 44u and 44h. Switch 122a will then open and switches 122b, 122c and 122d will close. In consequence of open switches 115a and 122a, both solenoids 147 and 148 will be de-energized and arm 37 will be hydraulically locked in position to record or remember the weight indicated by the position of arm 28. In the event that the rightward movement of arm 37 over-shoots the position of shield 29, light from slit 40u will be blocked by shield 29. Solenoid 114u will be de-energized, switch 115a will close to energize solenoid 148 through closed switch 122b, and solenoid 147 will remain de-energized by virtue of open switch 122a, since light from slit 40h will be exposed to shine on phototube 44h. Piston 46 will thus shift to the right to swing arm 37 counterclockwise back into alignment with indicating arm 28.

When the position of alignment between arms 28 and 37 is stabilized, light from both slits 40u and 40h will energize both phototubes 44u and 44h, so that both switches 115a and 122a will be open to de-energize both solenoids 147 and 148, and both switches 115c and 122c will be closed to energize solenoid 145 and initiate the closing of time delay switch 146. After a predetermined time interval sufficient to assure that arm 37 has come to rest in alignment with arm 28 and that the return or rightward shuttle movement has been completed, time delay switch 146 will close. By this time, the carriage 65 will have reached the bottom of the milling stroke to close limit switch 131, whereby solenoid 132 is energized and switch 133a is closed as aforesaid. Solenoid 98 is thus energized to register the end of the weight recording operation by shifting actuator 96 downwardly and returning switches 96a and 96i to their positions shown in Fig. 7. The opening of switch 96f de-energizes solenoid 143 to open switches 144a and 144b, de-energizing lights 42u, 42h, 78u and 78h, and also to open switches 144c through 144e in the recording circuits K, L, and N If the initial equilibrium position of arm 28 after the weighing operation is at the left of its position of alignment with arm 37, indicating that the piston is heavier than the previously recorded weight, arm 37 will be swung leftward into alignment with arm 28 as described above in regard to rightward overshooting of arm 37.

*Checking and sorting operations*

As stated above, lamps 78u and 78h are energized simultaneously with energizing of lamps 42u and 42h, so that simultaneously with the weighing operation, the weight of the piston at the re-weighing station is checked to determine if it is within the allowable weight tolerance. In the usual course of operation, the piston at the re-weighing station will have been milled at the milling station to a predetermined weight, so that before plungers 32 and 83 settle slowly to their lowermost positions and lamps 78h and 78u are energized by the closing of limit switch 89c, balance 70 will come to an equilibrium position substantially as shown in Fig. 5. If the weight of the piston at the re-weighing station is slightly heavier or slightly under the exact desired weight, the position of shield 76 will be shifted correspondingly to the right or to the left from the position shown.

As explained above in regard to Fig. 5, shield 76 extends arcuately in opposite directions a distance equal to the arcuate distance between the fixed slits 79h and 79u, less twice the arc of tolerance 80. Thus when arm 75 is at the position shown in Fig. 5, phototubes 82u and 82h will be energized by light from splits 79h and 79u respectively. Phototubes 82u and 82h are operatively coupled by means of amplification circuits 155u and 155h with solenoids 156u and 156h respectively to energize the same when the corresponding phototube is energized by light from the corresponding slit 79u or 79h. Similarly to the amplification circuits 113u and 113h, the amplification circuits 155u and 155h receive power through circuit H and may be conventional.

If the piston on platform 72 is sufficiently under-weight so that the equilibrium position of shield 76 is displaced counterclockwise from the position shown by an arc greater than the arc of tolerance 80, light from slit 79h will be blocked by shield 76 from phototube 82h and the latter will be de-energized. Slit 79u will continue to be exposed to emit light to phototube 82u to energize the latter. Thus solenoid 156u will be energized, while solenoid 156h will be de-energized. Energized solenoid 156u opens normally closed relay switch 157a and closes normally open relay switch 157b. Since the rightward or return shuttle movement is now either complete or nearly so, limit switch 94d is closed, so that solenoid 23u is energized through closed switch 157b, thereby to close normally open holding relay switch 158 and also to swing gate 19u to the angular position shown by dotted lines in Fig. 1. Thereafter the piston which is moved leftward from the re-weighing station during the next successive shuttle movement will be deflected by gate 19u to the right as indicated at 11u. If the piston at the reweighing station is sufficiently heavier than the desired exact weight so as to swing shield 76 clockwise by more than the arc of tolerance 80 from the equilibrium position shown, light from slit 79h will shine on phototube 82h to energize the same and solenoid 156h, thereby to open normally closed relay switch 160a and to close normally open relay switch 160b, whereby solenoid 23h is energized to close holding relay switch 161 and to shift gate 19h angularly across the path of shuttle movement. In consequence the piston which is shuttled leftward from the reweighing station will be diverted to the left as indicated at 11h.

The weight checking operation at the reweighing station takes place almost immediately upon the illumination of lamps 78h and 78u and substantially prior to the closing of time delay switch 146. Accordingly by the time the latter switch closes, the appropriate overweight or underweight gate will have been actuated by its corresponding solenoid 23h or 23u, providing that the equilibrium position of scale 76 differs from the position shown by more than the arc of tolerance 80. In such an event, the energized solenoid 23h or 23u will remain energized by virtue of its respective holding switch 161 or 158 even after the subsequent de-energizing of the associated solenoid 156h or 156u and the opening of switch 160b or 157b. Both of the latter switches will reopen when lamps 78h and 78u are turned off by the downward resetting movement of actuator 96 and the opening of switch 96g at the conclusion of the weight recording operation. Thus once one of the gates 19u or 19h is shifted angularly across the path of shuttle movement, it will remain in the angular position until completion of the next successive leftward shuttle movement, at which time the overweight or underweight piston will have been properly deflected. Upon completion of the next successive leftward shuttle movement, the opening of limit switch 94d will open circuit I to cause the deflected gate to return to its solid line position in Fig. 1.

If the weight of piston 11d at the reweighing station is within the allowable weight range, so that shield 76 is not shifted more than the arc of tolerance 80 in either direction from the position shown, both phototubes 82h and 82u will be energized, both solenoids 156h and 156u will be energized, and boh switches 160a and 157a will be open. In consequence, neither solenoid 23h nor 23u will be energized and neither gate 19h nor 19u will shift from its position shown in solid lines, Fig. 1. The piston which is shuttled leftward from the reweighing station during the next successive shuttle operation will thus move straight ahead as indicated at 11e.

Finally, upon completion of the weight recording operation and the downward shifting of actuator 96 as aforesaid, lamps 42u, 42h, 78u and 78h will be extinguished by the de-energizing of solenoid 143. The closing of switch 95c energizes solenoid 106 to cause rightward shifting of slide valve 108, thereby to start the upward movement of plungers 32 and 83 and to open limit switch 89c. When plungers 32 and 83 reach their upward limits of movement, limit switches 89a and 89b close, solenoid 111 is energized, and lamps 51u and 51h are energized to initiate the next successive mill adjustment operation. Assuming that another piston to be weighed and milled has been placed at the feed station so as to close limit switch 95, the next successive leftward shuttle movement is also initiated by energizing solenoid 101 through closed switch 96a, as at the beginning of the cycle.

*Excessive overweight or underweight pistons*

It sometimes occurs that a piston is so much overweight that it should be impractical to mill sufficient material therefrom to bring it to be proper weight. If on the other hand a piston is too far underweight, the defect cannot be remedied by removing material. When such pistons are involved provision is made to expedite the cycle by eliminating the milling operation.

Assuming by way of example that a piston to be weighed is so heavy that the removal of sufficient material in the milling operation to reduce the piston to the desired weight would spoil the same, shield 29 will swing during the weighing operation substantially to the left of the position shown in Fig. 2. Simultaneously, as in the case of any other weighing operation, plungers 32 and 83 will be slowly settling and the milling operation on the piston weighed during the previous cycle and now at the milling station will be proceeding. Finally when plunger 32 reaches the bottom of its movement to close limit switch 89c and energize lights 42u, 42h, 78u and 78h, weight recording and sorting operations at the weighing in and reweighing stations are initiated. Light from slit 40u will be blocked by shield 29, but light from slit 40h will pass to the right of shield 29 in Fig. 3 to energize photocell 44h and close switch 122b, thereby to energize solenoid 148 in circuit K and to cause the rightward shifting of slide valve 153. In consequence piston 46 is driven to the right in Fig. 3 and arm 37 with lights 42u and 42h is swung leftward in an attempt to align itself with arm 28.

Because of the excess weight of the piston as aforesaid, projection 162 on the lower extension 50 of arm 37 will engage limit switch actuator 163 before the position of alignment between arms 37 and 28 is reached, opening limit switch 163a and closing limit switch 163b in circuits K and P respectively. The opening of limit switch 163a de-energizes solenoid 148, so that spring 154 returns slide valve 153 to the neutral position shown in Fig. 3 to stop leftward swinging of arm 37. Closing of limit switch 163b in circuit P energizes solenoid 164 which opens normally closed time delay relay switches 165a and 165e and closes normally open relay switches 165b, 165c, 165d, 118a and 145a. Closing of the latter switch energizes solenoid 145 to initiate the closing of slow-to-close time delay switch 146.

It is to be noted that the weight of the piston currently at the milling station was recorded and wedge 60 adjusted correspondingly during the preceding cycle. The downward milling movement of slide 65 to mill that piston in the current cycle was initiated prior to the current weight recording operation on the piston now at the weighing station. Since the time required for the counterclockwise swinging of arm 37 to the extreme limit necessary to open limit switch 163a exceeds the time required for the usual weight recording operation, the current downward milling movement will already have been completed and solenoid 132 will have been energized by the closing of limit switch 131, thereby to close switches 133a, 133b and 133d and to open switch 133c prior to the closing of limit switch 163b. In consequence, prior to the closing of switch 165d and opening of switch 165e, solenoid 134 will have been energized and actuator 135 will be at its downward position shown, the mill down solenoid 127 will be deenergized, the mill up solenoid 129 will be energized, and carriage 65 will at least have started upward to re-open limit switch 131.

The simultaneous closing of switch 165d and opening of switch 165e energizes solenoid 136 and de-energizes solenoid 134, causing upward shifting of actuator 135 to open switches 135a, 135b, and 135c and to close switch 135d. The opening of switch 165a interrupts the power to switches 115b and 122b, so that the operation of these switches will now be immaterial. Closing of switch 165b has no effect by virtue of limit switch 163a which is now open. Closing of switch 165c energizes solenoid 147, whereby slide valve 151 is shifted to the left in Fig. 3 to cause leftward shifting of piston 46 and clockwise swinging of recording arm 37. Projection 162 is thus moved off of actuator 163, closing switch 163a and opening switch 163b. The re-opening of limit switch 163b de-energizes solenoid 164, causing switches 165b, 165c and 165d to re-open and immediately de-energize both solenoids 147 and 148 as well as solenoid 136. Clockwise swinging of arm 37 will thus stop. Actuator 135 will be retained in the upper position by overcenter spring 138.

The de-energizing of solenoid 164 also initiates the opening of time delay switches 118a and 145a, which are slow to open, and the closing of time delay switches 165a and 165e, which are slow to close, as indicated by the associated arrows. Switches 165a and 165e delay closing until after lights 42u, 42h, 78u and 78h are turned off and switch 133b re-opens as described below. The fact that switch 122b is now closed is immaterial because switch 165a has not yet closed. Switch 145a delays opening until after time delay switch 146 closes, whereby solenoid 98 is energized to reset switches 96a through 96i to their downward positions shown. In the above regard, circuit Q is open by reason of normally open switch 119, solenoid 118 being de-energized by reason of normally open switch 112d which is closed only during the mill adjusting operation when solenoid 111 is energized, as described above. Upon completion of the return or upward movement of plungers 32 and 83, actuator 89 is raised to close limit switches 89a and 89b, whereby solenoid 111 is energized and switches 112a and 112d are closed. Closing of the latter switch energizes solenoid 118 through time delay switch 118a, which has as yet not opened after the de-energizing of solenoid 164. The closing of time delay switch 119 is thus initiated. Also as described above, the circuit is now in condition to start the next successive leftward shuttle movement upon completion of the current upward movement of carriage 65 and upon the closing of limit switch 95 by the positioning of a new piston at the feed station.

The opening of switch 96f de-energizes solenoid 143, thereby to de-energize the light circuits Gb and Gc and the weight recording circuits K and L. Thereafter time delay switch 145a opens to de-energize solenoid 145 in circuit N. Time delay switch 165a now closes without energizing solenoids 147 and 148. The opening of switch 96i de-energizes solenoid 132, permitting switches 133a, 133b and 133d to open and switch 133c to close. Time delay switch 165e now closes without energizing solenoid 134. Open switch 96h permits the closing of switch 133c without energizing the mill down solenoid 127.

The above stated opening of switches 135a and 135b prevents the subsequent energizing of solenoids 123 and 116 in circuits J and M, so that during the next successive leftward shuttle movement which shifts the excessively overweight piston to the milling station, no mill adjustment operation as described above can take place. Upon the closing of time delay switch 119, solenoid 97 is energized and switches 96a through 96i are shifted upwardly just as if a normal mill adjustment operation had been completed. Time delay switch 118a now opens. In the meanwhile the next successive leftward shuttle movement is completed as described above, opening limit switches 94a and 94b and closing limit switch 94c. The downward movement of plungers 32 and 83 is initiated by the closing of limit switch 94c. The next successive rightward or return shuttle movement is initiated by the opening of limit switch 94a.

Open switch 135c prevents the mill down solenoid 127 from being energized upon the closing of switch 96h and during the next successive rightward or return shuttle movement, thereby to prevent downward movement of milling carriage 65 and the closing of limit switch 131 while the excessively overweight piston is at the milling station. Closed switch 135d however by-passes limit switch 131 to energize solenoid 132 in circuit W upon the closing of switch 96i, so that normally open switches 133a and 133d close, the closing of time delay switch 133b is initiated, and normally closed switch 133c opens. The latter prevents the energizing of the mill down solenoid 127 upon the subsequent closing of switch 135c. Thereafter, time delay switch 133b closes to reset actuator 135 at its downward position, just as if a normal milling operation had been completed.

When plunger 32 reaches its lower limit of movement and closes limit switch 89c, lights 42u, 42h, 78u, and 78h are turned on in consequence of the energizing of solenoid 143. The weight of the new piston at the weighing station is now recorded by the swinging of recording arm 37 into alignment with arm 28, as explained above, whereupon time delay switch 146 in circuit R is again caused to close to energize solenoid 98. Switches 96a through 96i are thus reset at their downward positions shown to extinguish all lights and initiate the upward movement of plungers 32 and 83 in preparation for the next successive leftward shuttle movement.

Similarly, in the event that the weight of the piston at the weighing station is less than a predetermined minimum, the weight indicating arm 28 and shield 29 will swing during the weighing operation substantially to the right or clockwise of the position shown in Fig. 2. Thereafter when plunger 32 reaches its lower limit of movement to close switch 89c and energize lamps 42u, 42h, 78u and 78h, light shining through slit 40u will energize phototube 44u, thereby to energize solenoid 114u and close switch 115b. Solenoid 147 is thus energized to cause rightward or clockwise swinging of recording arm 37 in an attempt to align the latter with the weight indicating arm 28. Inasmuch as the piston under discussion is underweight beyond the tolerable limit, projection 166 of arm 50 will engage limit switch actuator 167 before the aforesaid position of alignment is reached. Shifting of the latter actuator opens limit switch 167a in circuit L to de-energize solenoid 147 and closes limit switch 167b in circuit P to energize solenoid 164, whereby substantially the same circuit changes are accomplished as described above in the case of an excessively overweight piston.

Switches 165a and 165e open, switches 165b, 165c, 165d, 118a and 145a close; solenoid 136 is energized through switch 165d to cause upward shifting of actuator 135, thereby to open switches 135a, 135b and 135c and to close switch 135d; the closing of time delay switch 146 is initiated by the closing of switch 145a, switch 133a being already closed by completion of the current downward milling movement; and solenoid 148 is energized by the closing of switch 165b, causing counterclockwise swinging of arm 37 until projection 166 moves off actuator 167 to close switch 167a and open 167b. Solenoid 164 is thus de-energized and switches 165b and 165c re-open to de-energize both solenoids 147 and 148. After termination of the weight recording operation and the closing of time delay switch 146, switch 145a opens.

By this time and in fact prior to the upward shifting of actuator 135, the downward milling movement on the previously weighed piston, now at the milling station, is completed as aforesaid, so that switch 133a is closed and solenoid 98 is energized through the closed switches 146 and 133a. Switches 96a through 96i are thus reset at their downward positions shown as in the instance of completion of an ordinary weight recording operation.

I claim:

1. In a weighing device which indicates a deviation in weight of an object from a fixed predetermined weight and which is coupled with a second sorting device, the mode of action of which is determined by said deviation: the improvement which comprises a movable weight indicating arm; an opaque shield on said movable weight indicating arm; a pair of light focusing lens positioned forward of said opaque shield; a pair of photocells positioned forward of said lens; a housing positioned rearwardly of said opaque shield; said housing having a pair of spaced slits therein; said slits positioned apart a distance greater than the width of said opaque shields; a pair of light sources, one positioned behind each slit, so as to direct a beam of light therethrough; each slit in alignment with a lens and photocell; each photocell de-energizable upon movement of said opaque shield to activate said second sorting device.

2. In a weighing device which indicates a deviation in weight of an object from a fixed predetermined weight and which is coupled with a second sorting device, the mode of action of which is determined by said deviation: the improvement which comprises a platform balance having a knife edge; a platform on one end of said balance adapted to receive the object to be weighed; a fixed weight counterbalance on the opposite end of said balance; a movable weight indicating arm on said balance between the counterweight and platform; an opaque shield on said movable weight indicating arm; a weight recording arm rearwardly of said weight indicating arm and pivotable about the same axis as said movable weight indicating arm and said knife edge; an opaque cross member on said weight recording arm; a pair of spaced slits in said opaque cross member; said slits spaced apart a distance greater than the width of said opaque shield; a light source positioned behind each of the slits in said cross member; a pair of light focusing lens positioned forward of said opaque shield; a pair of photocells positioned forward of said lens; one of said bulbs, one of said lens, and one of said photocells being in operational alignment and the other of said bulbs, the other of said lens, and the other of said photocells being in operational alignment; means responsive to the de-energizing of either of said photocells during a weighing operation to adjust the position of said weight recording arm relative to said weight indicating arm such that said opaque shield does not obscure the slits in said cross member and whereby the assumed position of the weight recording arm registers a deviation in the weight of said object; and means to lock said weight recording arm in position after completion of the weighing operation.

3. In a weighing device which indicates a deviation in weight of an object from a fixed predetermined weight and which is coupled with a second sorting device, the mode of action of which is determined by said deviation: the improvement which comprises a platform balance having a knife edge; a platform on one end of said balance adapted to receive the object to be weighed; a fixed weight counter balance on the opposite end of said balance; a movable weight indicating arm on said balance between the counterweight and platform; an opaque shield on said movable weight indicating arm; a weight recording arm rearwardly of said weight indicating arm and pivotable about the same axis as said movable weight indicating arm and said knife edge; an opaque cross member on said weight recording arm; a pair of spaced slits in said opaque cross member; said slits spaced apart a distance greater than the width of said opaque shield; a light source positioned behind each of the slits in said cross member; a pair of light focusing lens positioned forward of said opaque shield; a pair of photocells positioned forward of said lens, one of said bulbs, one of said lens, and one of said photocells being in operational alignment and the other of said bulbs, the other of said lens, and the other of said photocells being in operational alignment; means responsive to the deenergizing of either of said photocells during a weighing operation to adjust the position of said weight recording arm relative to said weight indicating arm such that said opaque shield does not obscure the slits in said cross member and whereby the assumed position of the weight recording arm registers a deviation in the weight of said object; means to lock said weight recording arm in position after completion of the weighing operation; an adjustment arm pivotable coaxially and rearwardly of said weight recording arm; a housing on said adjustment arm, said housing been adapted to take a position which would intercept a rearward projection of said cross member, said housing being provided with two circumferentially spaced slits said spacing being somewhat wider than the width of said cross member, and said housing being provided with two electric light bulbs each positioned behind a slit in a manner to direct a beam of light forwardly through a slit when energized and each positioned in operational alignment with one of said lens and one of said photocells; means responsive to the de-energizing of either of said photocells following a weighing operation to adjust the position of said adjustment arm relative to said weight recording arm such that said cross member does not obscure the slits in said housing and whereby the assumed position of the adjustment arm registers said deviation in the weight of said object; and means cooperable with said control device to remove excess material from said part, the extent of such excess material removal being responsive to the position of said adjustment arm.

References Cited in the file of this patent

UNITED STATES PATENTS

| | | |
|---|---|---|
| 1,888,673 | Humphrey | Nov. 22, 1932 |
| 2,116,895 | Howard | May 10, 1938 |
| 2,612,995 | Kahle et al. | Oct. 7, 1952 |
| 2,664,557 | Sargrove | Dec. 29, 1953 |
| 2,687,272 | Schieser et al. | Aug. 24, 1954 |
| 2,690,702 | Romans et al. | Oct. 5, 1954 |
| 2,694,960 | Kahle et al. | Nov. 23, 1954 |
| 2,838,176 | Pettis | June 10, 1958 |